United States Patent [19]

Kaganowicz

[11] 4,369,604
[45] Jan. 25, 1983

[54] METHOD FOR MECHANICALLY PREPARING STYLUS LAPPING DISCS

[75] Inventor: Grzegorz Kaganowicz, Princeton, N.J.

[73] Assignee: RCA Corporation, New York, N.Y.

[21] Appl. No.: 238,805

[22] Filed: Feb. 27, 1981

[51] Int. Cl.³ .......................... B24B 1/00; G11B 3/00
[52] U.S. Cl. .................................. 51/281 R; 369/55; 369/71; 369/126; 51/325
[58] Field of Search ............... 51/281 R, 206 R, 295, 51/309; 369/126, 128, 53, 13, 71, 277, 55, 56

[56] References Cited

U.S. PATENT DOCUMENTS

| Re. 29,113 | 1/1977 | Halter | 358/128 |
|---|---|---|---|
| 915,936 | 3/1909 | Cheney | 369/277 |
| 1,481,461 | 1/1924 | Emerson | 369/277 |
| 3,481,083 | 12/1969 | David et al. | 51/281 R |
| 3,842,194 | 10/1974 | Clemens | 178/6.6 A |
| 4,098,030 | 7/1978 | Fuhrer et al. | 51/281 R |
| 4,104,832 | 8/1978 | Keizer | 51/281 R |
| 4,162,510 | 7/1979 | Keizer | 358/128 |
| 4,297,312 | 10/1981 | Carroll et al. | 369/126 |
| 4,308,337 | 12/1981 | Roach et al. | 369/277 |
| 4,310,915 | 1/1982 | Gunter | 369/13 |

FOREIGN PATENT DOCUMENTS

| 53-29105 | 3/1978 | Japan | 369/55 |
|---|---|---|---|

OTHER PUBLICATIONS

U.S. Patent application Ser. No. 128,871, filed 3/80, Roach et al., "Method for Preparing Keel Lapping Discs".

U.S. Patent application Ser. No. 118,088, filed 2/80, Carroll et al., "Method for Preparing Stylus Lapping Discs".

*Primary Examiner*—Harold D. Whitehead
*Assistant Examiner*—Robert A. Rose
*Attorney, Agent, or Firm*—E. M. Whitacre; J. S. Tripoli; J. E. Roehling

[57] ABSTRACT

A keel-tipped stylus for playback of video information from a disc record comprises a tapering body, a constricted terminal region and shoulders joining the tapering body to the constricted terminal region. A method for preparing a deep groove plastic replica disc for use in lapping the constricted terminal region on the tip of the playback stylus is disclosed. The method includes the step of mechanically cutting a deep groove into a metal substrate surface with a diamond cutting stylus. The diamond cutting stylus has a tip having a shape complementary to the shape of the keel groove to be formed into the metal surface. During the mechanical cutting operation, the tip of the stylus is introduced into the metal surface to a depth sufficient to cut the deep groove to the desired depth across the surface of the metal substrate.

6 Claims, 12 Drawing Figures

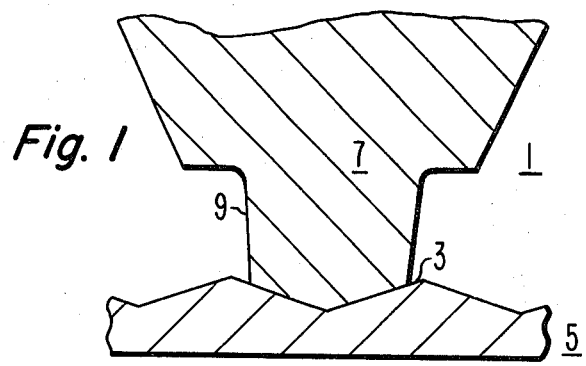
Fig. 1
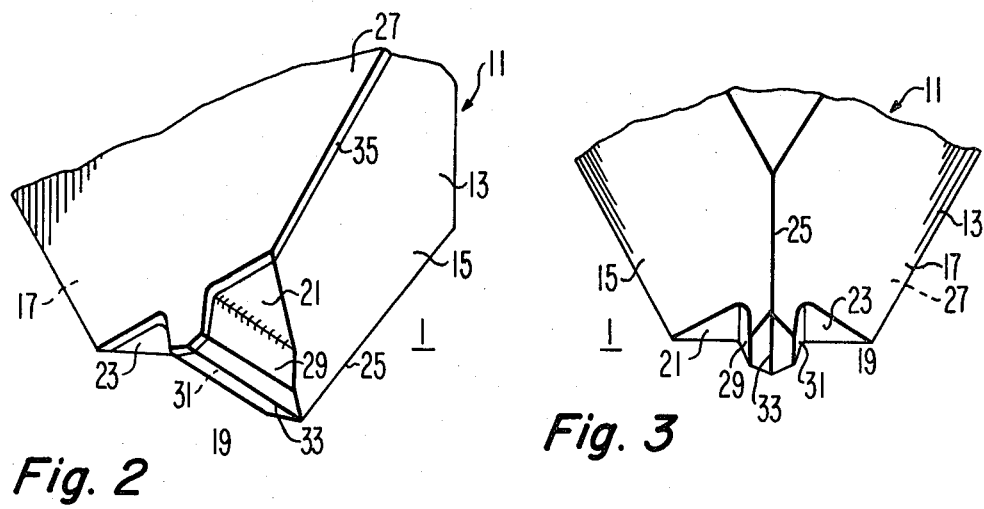
Fig. 2
Fig. 3
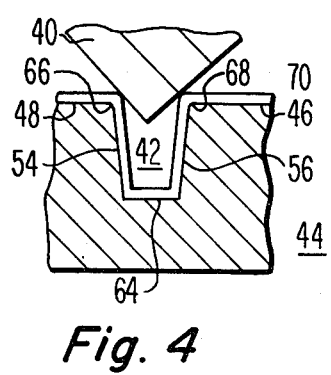
Fig. 4
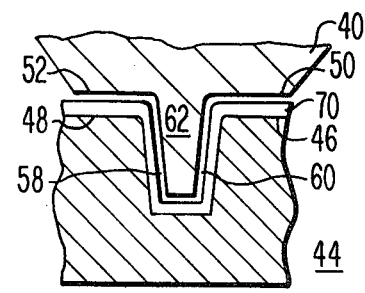
Fig. 5

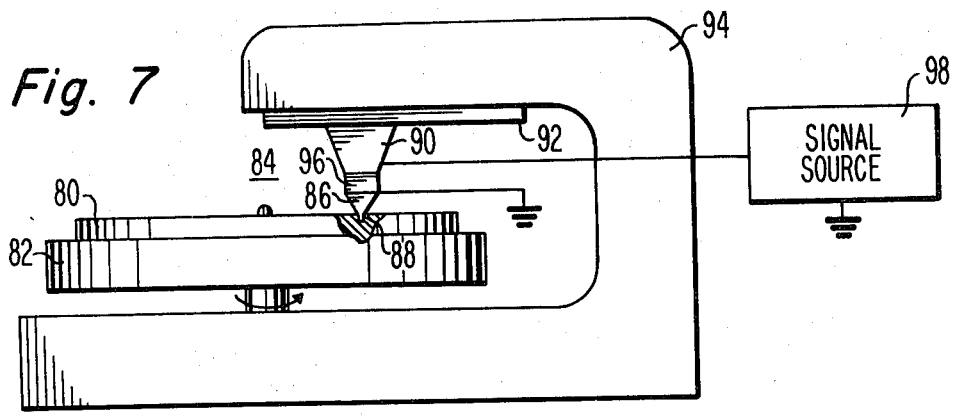
Fig. 7
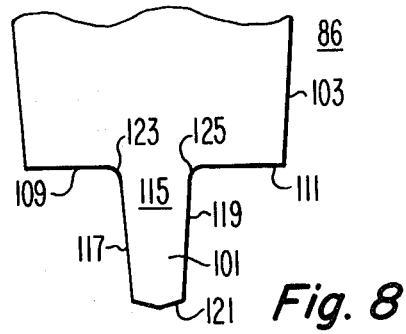
Fig. 6
Fig. 8
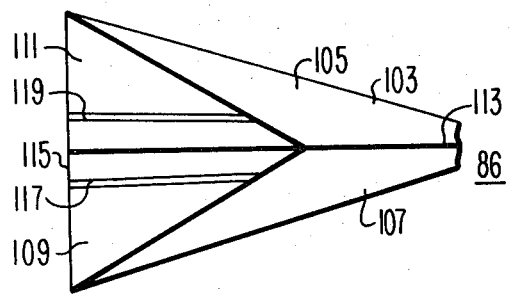
Fig. 9
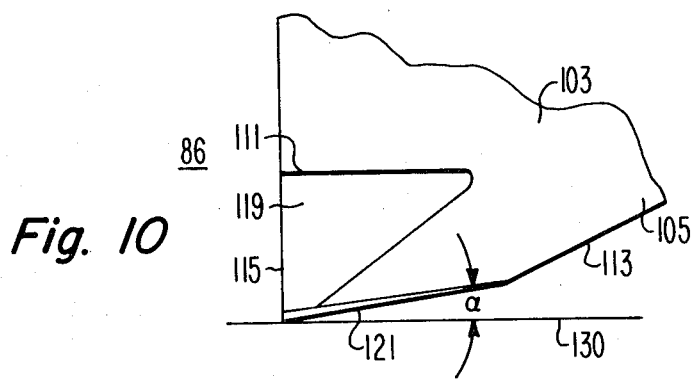
Fig. 10

METHOD FOR MECHANICALLY PREPARING STYLUS LAPPING DISCS

The present invention relates to mechanical mastering techniques for video disc and, more particularly, to a method and apparatus for mechanically cutting a deep groove in a disc which is to be used for lapping a video disc playback stylus.

In U.S. Pat. No. 3,842,194 issued on Oct. 15, 1974 to J. K. Clemens, a video disc playback system of a variable capacitance form is disclosed. In one configuration of a Clemens type video disc, information representative of recorded picture and sound is encoded in a relatively narrow spiral groove on the surface of a disc record. For example, the spiral groove may be 2.5 micrometers wide and 0.5 micrometers deep. During playback, a pickup stylus engages the spiral groove as the disc record is rotated by a turntable. Capacitance variations between a thin conductive electrode on the pickup stylus and a conductive property of the record surface are sensed to recover the information recorded on the disc.

In U.S. Pat. No. 4,162,510 issued on July 24, 1979 to E. O. Keizer, a keel-tipped playback stylus which may be used with a Clemens playback system is disclosed. The keel-tipped playback stylus comprises a dielectric support element having a body, a constricted terminal portion and shoulders interconnecting the body with the constricted terminal portion. The constricted terminal portion is defined by a prow, a substantially flat rear surface remote from said prow, substantially parallel side surfaces extending from the side edges of the rear surface, a bottom surface which preferentially conforms to the shape of the groove bottom extending from the bottom edge of the rear surface and a plurality of additional surfaces extending from the prow and intersecting the bottom and the side surfaces. The separation between the substantially parallel side surfaces is less than the width of the groove (illustratively, less than 2.5 micrometers wide).

A method for forming the keel tip on a Keizer type playback stylus is disclosed in U.S. Pat. No. 4,104,832 issued on Aug. 8, 1978 to E. O. Keizer. In accordance with the Keizer method, a tapered dielectric support element, made from a hard material, such as diamond, is placed in contact with an abrasive lapping disc having a deep, trapezoidally shaped, coarsely pitched spiral groove. Relative motion is established between the support element and the lapping disc. The lands on the lapping disc lap the shoulders of the keel-tipped playback stylus and the side walls of the deep groove form the substantially parallel side surfaces of the constricted terminal portion.

In the aforementioned Keizer method patent, it is suggested that the abrasive lapping disc be formed by optical or other high intensity beam techniques. In accordance with these techniques a flat, smooth copper clad substrate is coated with a thick coating of photoresist. The photoresist coated substrate is then exposed with a beam of high energy (e.g., electron or light beam) of a narrow width (e.g., 3.5 micrometers) along a spiral track of a coarse pitch (e.g., 6-10 μm). The exposed photoresist is removed to form a coarse spiral groove on the substrate surface. Metal stampers are obtained from the substrate by plating techniques. The metal stamper may then be used to press plastic lapping discs having a groove of substantially the same shape and size as the groove which was formed in the original substrate. An abrasive material, such as $SiO_2$, may be deposited on the plastic disc to form an abrasive layer suitable for lapping the keel tip on a playback stylus.

For several reasons, the mastering techniques described above may not be completely satisfactory for the manufacture of keel lapping discs. It is very difficult using the aforementioned mastering techniques to control the depth and width of the deep keel lapping groove within the tolerances permitted in the video disc system.

The depth of the keel lapping groove is controlled by the thickness of the photoresist coated on the copper clad substrate. Since the groove depth should be maintained within a tenth of a micrometer, variations of a fraction of a micrometer in the thickness of the photoresist across the surface of a 12 inch diameter (i.e., 30 cm) disc or surface imperfections on the order of a few micrometers (e.g., 3 micrometers) can render a substrate unusable. To control the quality and thickness of the photoresist layer over such a large area is a time consuming and tedious process.

Further, the groove width must be controlled to within a small fraction of a micrometer along the length of the groove spiral. Illustratively, the groove length may be 6 km. The groove width which, in the prior art techniques, is a function of the surface exposure and the time of development is difficult to control from substrate to substrate. It is extremely difficult to control all of the processing variables so that the groove depth and width do not vary substantially across the surface of a 30 cm diameter disc.

In addition to the problems of controlling the groove width and depth, prior art mastering techniques include processing steps that are time consuming and tedious. For example, after the photoresist has been applied to the metal substrate prior art techniques include a step of uniformly irradiating the photoresist layer with actinic radiation. This processing step of uniform irradiation which is described in detail in U.S. patent application Ser. No. 128,871 filed on Mar. 10, 1980 now U.S. Pat. No. 4,308,837 for W. R. Roach et al. reduces the undercutting of the groove. In the absence of the exposure step, some of the developer solvent attacks the unexposed photoresist beneath the surface during photoresist development.

In another prior art mastering step, the nickel master, which is formed by plating over the developed substrate, is coated with a layer of photoresist. The photoresist fills-in between the wall of the groove (i.e., projection on the nickel master which is a negative of the substrate) and the base surface of the nickel master to form a concave junction. Further, processing steps with respect to this filling-in process may include electroplating the nickel master surface with a thin, conformal, conductive metal layer of gold, copper or nickel. This photoresist coating step and subsequent operation (i.e., filleting) provides a smooth transition between the keel shoulder and wall to reduce the incidence of keel-tipped stylus breakage during playback.

According to the Keizer method, a separate processing step must be included during the manufacture of the stylus to provide a keel-tipped playback stylus having a bottom surface which conforms to the shape of the groove bottom of the video disc. This separate step involves a second lapping operation wherein the playback stylus bottom shape is lapped after the keel has been formed. A second lapping operation adds time and cost to the manufacturing of video disc styli.

Another problem associated with prior art mastering techniques has been the occurrence of locked grooves on the lapping replica. As a stylus is being lapped, the removal of material essentially ceases when the stylus is kicked back into the same convolution over and over because of the presence of a locked groove. It is not completely clear what the origin of the locked groove defects is but it is generally agreed that the problem is associated with the quality of the record surface—the photoresist may not be uniform, there may be some dust accumulation on the copper surface prior to putting down the photoresist, copper is a very delicate material which is susceptible to micrometer size imperfections which are deleterious to the lapping process. In accordance with the principles of the present invention, locked grooves are substantially eliminated by mechanical cutting of keel-lapping grooves in metal substrates.

Further, in accordance with the principles of the present invention, a mechanical mastering technique is provided to form the keel-lapping substrate. It has been discovered that mechanical cutting of keel-lapping grooves provides keel-lapping substrates of improved quality. By mechanically cutting, the depth and width of the keel-lapping groove may be controlled within desired tolerances. This is a difficult task to achieve when cutting a groove having a depth to width ratio of about 2:1 and absolute dimensions which are on the order of the dimensions of a video disc playback stylus.

Additionally, in accordance with the principles of the present invention the uniform irradiation, filleting and keel-tip bottom lapping steps may be eliminated from the keel-lapping process. The uniform irradiation is not required in a mechanical mastering technique. Since a mechanically cut, deep keel, groove may be formed having a shoulder-keel radius and a conformal bottom, the filleting operation and the separate step of lapping the keel-tip bottom are not necessary.

In accordance with one aspect of the present invention, a method for preparing a deep groove replica for use in lapping a keel of a video disc playback stylus is provided. A video disc playback stylus is formed having a keel defined by a constricted terminal region on a tip of the stylus. This constricted terminal region is narrower than the width of a groove used to guide the stylus during recovery of prerecorded signals in the bottom thereof. According to the method a metal substrate is mounted on a turntable. Relative motion is established between a cutting stylus and the metal substrate. While the master is moving relative to the stylus, the cutting tip of the stylus is introduced into a surface of the metal substrate, thus mechanically cutting a deep groove, for subsequent lapping of the keel on a playback stylus, into the surface of the metal substrate. In one embodiment the cutting tip has a shape complementary to the shape of the keel of the playback stylus. The cutting operation is performed in a single pass, i.e., the cutting tip is introduced into the metal substrate surface to a depth equal to the depth of the deep groove. Following the cutting step, a metal part is formed from the grooved metal substrate. A replica for lapping the keel on the playback stylus is stamped from the metal part where the replica formed by stamping from the metal part has a groove of a shape and size substantially similar to the shape and size of the groove cut into the metal substrate.

Another problem associated with the stylus keel lapping process has been the inability to monitor the lapping of the stylus as it rides in the groove. In accordance with another aspect of the present invention, a signal is mechanically cut on the disc surface to provide a signal for monitoring the keel lapping process. In one embodiment in accordance with this recording aspect, the signal is formed in the keel-lapping groove bottom during the groove cutting operation. In another embodiment, the monitoring signal is cut in the land area between adjacent groove convolutions on the substrate surface.

Other features and advantages of the invention will be more fully understood from the following detailed description of the preferred embodiment, the appended claims and the accompanying drawings in which:

FIG. 1 illustrates a keel-tipped playback stylus riding in a disc record groove;

FIGS. 2 and 3 show perspective views of a keel-tipped stylus;

FIGS. 4 and 5 show a playback stylus at the start and completion of the lapping process respectively;

FIG. 6 shows a portion of a lapping disc suitable for forming the keel-tipped stylus of FIGS. 2 and 3;

FIG. 7 illustrates, partially in block diagram form, a mechanical cutting apparatus constructed in accordance with the principles of the present invention;

Figure 11:
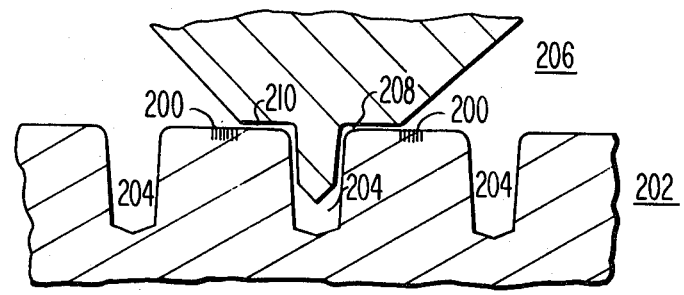
Figure 12:
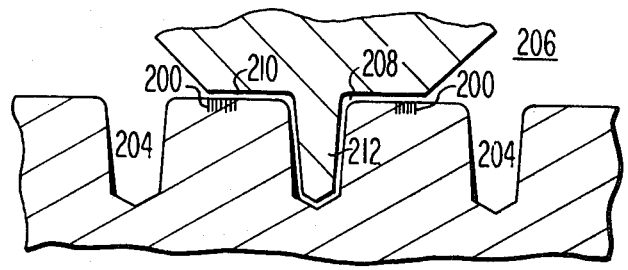

FIGS. 8, 9, and 10 show front, bottom, and side views respectively of a cutter tip suitable for cutting lapping discs of FIG. 6; and FIGS. 11 and 12 illustrate a portion of a lapping disc suitable for lapping the keel tip of a stylus of FIGS. 2 and 3.

FIG. 1 shows a pickup or playback stylus 1 riding in a V-shaped groove 3 disposed on the surface of a video disc 5. In video disc systems of the variable capacitance type, such as the aforementioned Clemens system, the stylus is moved relative to the groove. Capacitance variations between a conductive electrode on the stylus face 7 and a conductive property of the disc 5 are decoded by suitable signal processing circuitry for display on a television receiver. To obtain adequate playback time, the groove convolutions on the disc 5 are relatively closely spaced (e.g., groove pitch is 2.5 micrometers). In accordance with the aforementioned Keizer patent, pickup stylus 1 has a constricted terminal region 9 (i.e., keel-tip). The keel-tipped stylus 1 has the advantage of reducing or eliminating cross-talk between adjacent grooves in the signal pickup output signal as the stylus wears.

FIGS. 2 and 3 show perspective views of the keel-tipped playback stylus 1. As shown in the respective figures, the keel-tipped stylus 1 includes a dielectric support element 11 formed from a material such as diamond. The dielectric support element 11 comprises a body 13 having bevelled surfaces 15 and 17, a constricted terminal portion 19 and shoulders 21 and 23 joining the bevelled body to the constricted terminal portion.

The constricted terminal portion is defined by a prow 25, a substantially flat rear surface 27 remote from the prow, a pair of substantially parallel side surfaces 29 and 31 extending from the rear surface 27, and a bottom surface 33 extending from the bottom edge of the rear surface. The bottom surface may preferentially conform to the shape of the groove bottom of the playback record. A coating of conductive material 35 is provided on the flat rear surface 27. The conductive coating may be used as one electrode of the aforesaid capacitance system.

The fabrication of the keel tip of the playback stylus will now be discussed with reference to FIGS. 4 and 5, where a V-shaped stylus support 40 is made to engage a groove 42 of an abrasive lapping disc 44. The keel tip is formed on the stylus by running the V-shaped stylus 40 on abrasive lapping disc 44 having a deep coarse-pitched groove 42. The lands 46 and 48 on the lapping disc 44 lap the shoulders 50 and 52 of the stylus 40 and the walls 54 and 56 of the abrasive groove 42 form the substantially parallel side surfaces 58 and 60 of keel 62. The abrasive groove 42 may be provided with bottom surface 64 which is flat and the stylus footprint can be lapped later to conform to the shape of the playback disc groove bottom. Alternatively, as will be discussed in greated detail herein, the bottom 64' (as shown in FIG. 6) of abrasive disc 44' may be shaped to form a stylus shoe which conforms to the shape of the groove bottom of a playback disc. Shaping the groove bottom to provide a stylus shoe which will conform to the shape of the groove bottom of a playback disc at the same time that the keel is lapped has not been previously accomplished using prior art mastering techniques. This shaping operation eliminates a lapping step which was necessary when using prior art techniques.

Referring again to FIGS. 4 and 5, the groove 42 is provided with radii 66 and 68 formed between the groove walls 54 and 56 and the lands 48 and 46 respectively. Radii 66 and 68 provide a smooth transition between groove walls 54 and 56 and lands 48 and 46. The smooth transition at the corners of the playback stylus reduces the incidence of playback stylus breakage during signal recovery. By suitable modification, other shapes may be provided on various surfaces of the keel-lapping groove.

The manufacture of a lapping disc will now be described. In the preferred embodiment, a thin deposit of copper is electroplated on an aluminum substrate disc. The copper deposit is faced off to make the surface to be grooved relatively flat. As will be described in greater detail herein, the flat substrate is positioned on a turntable. A stylus which will be described herein is positioned with respect to the substrate in order to cut a coarse-pitched spiral lapping groove when relative motion is effected between the metal substrate and the cutting stylus. A metal stamper is obtained from the spirally grooved substrate by a process such as nickel plating. The metal stamper is used to press plastic discs. The plastic discs may be made from any material that would reproduce faithfully the groove shape. An abrasive material, such as SiO$_x$ where x has a value of between 1 and 2 is deposited on the surface of the plastic disc to form an abrasive layer 70 as shown in FIGS. 4 and 5.

FIG. 7 illustrates an apparatus for mechanically cutting a deep keel-lapping groove in a metal substrate 80. The metal substrate 80 is placed on a movable support 82 (i.e., turntable) in operating relationship with a cutterhead 84 including a cutting stylus 86. The cutting stylus 86 is positioned with respect to the metal substrate 80 in order to cut a groove 88 having a groove depth of illustratively 4.0 $\mu$m while the relative motion is established between the stylus and the metal substrate. A pedestal 90 which supports cutting stylus 86 is secured to a slide 92 which is movably supported on a frame 94. The pedestal 90 is translated on slide 92 along a line passing through the center of rotation of the metal substrate 80 in correlation with the rotational motion of the metal substrate such that a spiral groove 88 is cut on the surface of the metal substrate.

FIGS. 8, 9, and 10 illustrate front, bottom, and side views respectively of a tip of the cutting stylus 86. Cutting stylus 86 formed of a hard material, illustratively diamond, has a protrusion 101 complementary to the shape of the keel-lapping groove to be cut in the metal master. The tip comprises a support body 103 having bevelled surfaces 105 and 107, the protrusion 101 which is a constricted terminal region and shoulders 109 and 111 joining the bevelled body to the constricted protrusion. The constricted protrusion 101 is defined by a prow 113, a substantially flat cutting face 115 remote from the prow, a pair of side surfaces 117 and 119 extending from the side cutting edges of the cutting face 115 and a bottom surface 121 extending from the bottom cutting edge of the cutting face. The bottom surface 121 may be provided with a shape which conforms to the shape of the groove bottom in a playback disc record, illustratively, bottom surface 121 is shown having a V-shape conformal to the groove bottom in video disc 5 of FIG. 1.

When the cutting stylus 86 is positioned on pedestal 90 for cutting into the metal substrate, the cutting face 115 is arranged to be substantially perpendicular to the surface of the metal substrate and substantially perpendicular to the direction of relative motion established between the cutting stylus and the metal substrate. In this arrangement, the bottom surface 121 of the cutting stylus is formed to provide a slight clearance angle $\alpha$ (illustratively, 5°–10°) between the groove bottom 130 and the bottom surface 121. In a similar manner, side surfaces 117 and 119 are formed such that there is a slight relief angle (illustratively, 1°–3°) between the groove walls and the side surfaces 117 and 119 when the stylus is engaged in the metal substrate. Further, cutting stylus 86 is formed with radii 123 and 125 between the intersection of side surfaces 117 and 119 and shoulders 109 and 111. The radii 123 and 125 provide radii 66 and 68 on groove 42 as shown in FIGS. 4 and 5.

During the cutting operation the stylus protrusion 101 which illustratively has dimensions of 4.0 $\mu$m in height and of 2.0 $\mu$m in width enters the metal substrate surface at least until radii 123 and 125 begin to form complementary radii in the metal substrate. The stylus tip should be engaged such that the tip having an aspect ratio of approximately 2:1 forms the lapping groove in a single pass across the metal substrate surface. It has been found that mechanical cutting of deep keel-lapping grooves has provided excellent results with improved yields in both metal substrates and keel-tipped styli.

One of the problems with prior art keel-lapping processes is the inability to monitor the lapping process. Referring again to FIG. 7, a piezoelectric element 96 is interposed between cutting stylus 86 and pedestal 90. A signal source 98 connected to piezoelectric element 96 may be used to provide a signal for forming undulations in the bottom of groove 88. These signals recorded in the groove bottom could be used during the lapping operation for monitoring the lapping process, for example, for indicating that the lapping operation is complete.

In another embodiment, the monitoring signal could be recorded in the land areas between groove convolutions. In accordance with this embodiment, the spiral lapping groove could be cut on the metal substrate and then a monitoring signal could be recorded in the land areas in a separate recording step.

FIGS. 11 and 12 illustrate one technique for recovering the monitoring signal during stylus lapping when the monitoring signal 200 is recorded in the land areas between adjacent groove convolutions. The cross-sectional view of disc 202 illustrates three successive convolutions of a groove 204. FIGS. 11 and 12 show two stages in the lapping process. In the first stage (FIG. 11) stylus 206 has been partially lapped. At this point shoulders 208 and 210 do not extend over the prerecorded signal tracks 200. As shown in FIG. 12, indicative of the completion of the lapping process, monitoring signal 200 may be detected by the stylus shoulders. In accordance with this embodiment, the monitoring signal is retrieved when the stylus shoulders extend over the prerecorded signal 200, ie., when the stylus tip has been fully lapped.

What is claimed is:

1. A method for preparing a groove having a given depth for use in lapping a keel on a playback stylus, said playback stylus being suitable for playing back prerecorded signals from a disc record groove of a given width, said keel being defined by a constricted terminal region on a tip of said playback stylus, said constricted terminal region being narrower than said given width and having a dimension along at least one face thereof which is substantially equal to said given depth, said method comprising the steps of:

mounting a metal substrate on a turntable;
   establishing relative motion between a cutting stylus and said metal substrate;
   introducing a cutting tip of said cutting stylus into a surface of said metal substrate during said relative motion for mechanically cutting a groove into said surface of said metal substrate, said cutting tip having a shape complementary to the shape of said keel of said playback stylus, said relative motion being established such that said groove is formed in said substrate surface in a spiral pattern;
   recording a signal on said surface of said metal substrate, said signal being provided for monitoring a playback stylus lapping process on a replica;
   forming a metal part from said grooved metal substrate; and
   stamping said replica from said metal part, said replica having a groove shape and size substantially similar to the shape and size of the groove cut into said metal substrate.

2. The method according to claim 1 wherein said monitoring signal is recorded on said surface of said metal substrate in the bottom of said groove.

3. The method according to claim 2 wherein said monitoring signal is recorded on said surface of said metal substrate in a land region between convolutions of said spiral groove.

4. The method according to claim 3 wherein said groove is cut at a depth of approximately 4.0 micrometers and a width of approximately 2.0 micrometers.

5. The method according to claim 4 wherein said groove has a V-shaped groove bottom and curved surfaces are formed between the groove side walls and said surface of said metal substrate.

6. The method according to claim 5 further comprising the step of:

coating said replica with an abrasive material and lapping a keel-tip of a playback stylus on said replica.

* * * * *